US009945610B2

(12) United States Patent
Wu et al.

(10) Patent No.: US 9,945,610 B2
(45) Date of Patent: Apr. 17, 2018

(54) ENERGY EFFICIENT INFRARED OVEN

(71) Applicant: Nike, Inc., Beaverton, OR (US)

(72) Inventors: Shih-Yuan Wu, Taichung (TW); Patrick Conall Regan, Taichung (TW); Guo-Chang Wang, Taichung (TW); Geoff M. Nichols, Ho Chi Minh (VN); Chih-Chi Chang, Yunlin County (TW)

(73) Assignee: NIKE, Inc., Beaverton, OR (US)

( * ) Notice: Subject to any disclaimer, the term of this patent is extended or adjusted under 35 U.S.C. 154(b) by 635 days.

(21) Appl. No.: 13/655,735

(22) Filed: Oct. 19, 2012

(65) Prior Publication Data

US 2014/0110390 A1 Apr. 24, 2014

(51) Int. Cl.

| | |
|---|---|
| ***A21B 1/00*** | (2006.01) |
| ***F26B 3/30*** | (2006.01) |
| ***F26B 15/18*** | (2006.01) |

(52) U.S. Cl.

CPC ................ *F26B 3/30* (2013.01); *F26B 15/18* (2013.01); *F26B 2210/12* (2013.01)

(58) Field of Classification Search

CPC ........... F26B 2210/12; F26B 3/30; F26B 3/34

USPC ........... 219/130.21, 388, 390, 395, 405, 411, 219/553, 711; 432/11, 144, 148, 150; 34/1 W, 1 X, 41, 68, 18, 39; 427/55, 427/372.2

See application file for complete search history.

(56) References Cited

U.S. PATENT DOCUMENTS

| | | | | |
|---|---|---|---|---|
| 3,533,117 A | | 10/1970 | Dinolfo | |
| 4,833,301 A | | 5/1989 | Furtek | |
| 5,128,506 A | * | 7/1992 | Dahne et al. | 219/85.13 |
| 5,261,165 A | * | 11/1993 | Tate | F26B 3/30 34/266 |
| 5,323,485 A | * | 6/1994 | Josefsson et al. | 392/417 |
| 5,345,061 A | * | 9/1994 | Chanasyk | B23K 1/008 219/388 |
| 6,291,027 B1 | | 9/2001 | Emch | |

(Continued)

FOREIGN PATENT DOCUMENTS

| | | |
|---|---|---|
| CN | 2930375 A | 8/2007 |
| CN | 101277626 A | 10/2008 |

(Continued)

OTHER PUBLICATIONS

International Preliminary Report on Patentability dated Apr. 30, 2015 in Application No. PCT/US13/065252, 8 pages.

(Continued)

*Primary Examiner* — Dana Ross

*Assistant Examiner* — Joseph Iskra

(74) *Attorney, Agent, or Firm* — Shook, Hardy & Bacon L.L.P.

(57) ABSTRACT

An oven may facilitate heating, curing, and/or drying processes for manufactured items, such as shoe parts, using multiple groups of infrared sources. Each group of infrared sources may comprise a plurality of sources having heating parameters, such as a peak wavelength, power, distance from items to be cured, number of infrared sources, etc. By staging different types of sources throughout an oven, different aspects of the curing process may be performed in an efficient fashion. Further, conditions within the oven such as temperature and relative humidity may be monitored and adjusted to optimize curing conditions.

15 Claims, 6 Drawing Sheets

(56) References Cited

U.S. PATENT DOCUMENTS

| | | | | |
|---|---|---|---|---|
| 6,962,669 | B2 | 11/2005 | Foreman | |
| 7,026,582 | B2 * | 4/2006 | Goenka et al. | 219/400 |
| 7,514,650 | B2 * | 4/2009 | Melgaard et al. | 219/388 |
| 8,378,263 | B2 * | 2/2013 | Biegelsen et al. | 219/216 |
| 2003/0055198 | A1 | 3/2003 | Langer et al. | |
| 2008/0175765 | A1 | 7/2008 | Cao et al. | |
| 2008/0176006 | A1 | 7/2008 | Yamamoto | |
| 2008/0229523 | A1 | 9/2008 | Carbonell et al. | |
| 2009/0102083 | A1 | 4/2009 | Cochran | |
| 2011/0002677 | A1 | 1/2011 | Cochran | |
| 2012/0151790 | A1 * | 6/2012 | Savarese | F26B 17/023 34/282 |

FOREIGN PATENT DOCUMENTS

| | | | |
|---|---|---|---|
| CN | 201515749 | U | 6/2010 |
| CN | 201888802 | U | 7/2011 |
| EP | 1472948 | | 3/2004 |
| WO | 03034858 | A1 | 5/2003 |
| WO | 2012079094 | A1 | 6/2012 |

OTHER PUBLICATIONS

Notification of Transmital of the International Search Report and the Written Opinion of the International Searching Authority, or the Declaration in PCT/US13/065252 dated Mar. 24, 2014, 19 pages.

European Search Report dated Sep. 26, 2016 for European Patent Application No. 13846719.6, 8 pages.

* cited by examiner

ENERGY EFFICIENT INFRARED OVEN

CROSS-REFERENCE TO RELATED APPLICATIONS

Not applicable.

FIELD

The present invention relates to ovens for use in manufacturing processes, such as curing and/or drying shoe parts during a shoe assembly process. More particularly, the present invention relates to infrared ovens that use multiple spectral sources to heat and cure/dry primers, adhesives, paints, dyes, resins, polymers, or any other type of material used to manufacture items such as shoes and/or shoe parts.

SUMMARY

The present invention relates to an energy efficient infrared oven for use in manufacturing processes. While examples of ovens in accordance with the present invention are described for application in a shoe manufacturing process, many other manufactured items may require or benefit from infrared heating. By way of example, the manufacturing of shoes, particularly athletic shoes, often involves assembling various components using adhesives to bond those components together, either permanently or until other joining mechanisms, such as stitching, may be employed. In order to obtain a strong adhesive bond suitable for extended use by an ultimate purchaser and/or wearer, particularly for athletic endeavors that place high demands upon the bond strength and bond durability, properly processing the adhesives used for shoe assembly is critical. However, the optimal use of such adhesives may require complicated and involved processes and the careful control of parameters such as the temperature, the ambient humidity, and other factors that impact the properties of materials being cured. For example, the physical performance and/or appearance of a material used in manufacturing a shoe or shoe part may critically depend upon the precise control of the ambient parameters used to cure that material. If the optimal ambient parameters cannot be provided, alternative approaches to attaining a desired performance level or appearance may be employed, such as the use of additional amounts of primers or adhesives, even if the additional amounts of primers or adhesives used as a "failsafe" in such a circumstance are potentially wasteful or even environmentally harmful. Thus, ovens and methods of curing using such ovens in accordance with the present invention may permit the manufacturing of a shoe of the same or higher quality than can be obtained through other processes that do not provide such precise control of ambient parameters during curing, while also providing, in some circumstances, reduced material cost and lessened environmental impact.

In addition to the quality of finished products and the efficient use of materials, ovens used in a manufacturing process also consume energy. Ovens in accordance with the present invention may utilize multiple groups or pluralities of infrared sources that optimally perform a desired function. For example, a first plurality of infrared sources may have a first peak emission wavelength that preferentially interacts with a first component of an item, while a second plurality of infrared sources may have a second peak emission wavelength that preferentially interacts with a second component of an item. Accordingly, operations on an item may be efficiently performed without expending energy emitting large amounts of radiation at unnecessary wave lengths.

While challenges in curing adhesives may be particularly present in the production of shoes, similar challenges may be faced by any manufacturing process using adhesives. Moreover, energy efficient infrared ovens in accordance with the present invention may be used for processes other than curing adhesives. Heating manufactured items and/or components of manufactured items using energy efficient ovens may serve any purpose.

While ovens and methods in accordance with the present invention are not limited to use in curing adhesives and primers used in applying adhesives, adhesives and primers for adhesives provide one particular example of the use of ovens and methods in accordance with the present invention. As explained above, the performance of compounds used in the adhesive process may be critical the ultimate creation of a high-quality shoe. The application of adhesives may be a multi-step process, with primers being applied to one or both parts to be joined, possibly in multiple layers. Different layers and/or different primers and different adhesives on different shoe parts may require independent curing or activation. Ovens and methods in accordance with the present invention may be used for some or all of the curing processes needed to manufacture a shoe or a portion of a shoe.

Curing processes, whether for primers or adhesives, often require heating a shoe part with the primer and/or adhesive applied to it to a precise temperature or range of temperatures and holding that part at that temperature for a predetermined amount of time. Sometimes, a particular primer or adhesive may benefit from a multi-stage heating process, with different temperatures being achieved and maintained in sequence. Further, other parameters such as the relative humidity in the ambient air around a shoe part, the flow of air around a shoe part, and other factors may impact the quality of an adhesive bond ultimately attained in shoe assembly. Adequately controlling the various parameters that may impact bond performance and shoe assembly has presented challenges in the shoe manufacturing process. One approach to the difficulties in managing adhesive curing parameters has been to perform rigorous quality control verification on fully or partially manufactured shoes to reject shoes or shoe components that, for whatever reason, failed to attain adequate bond strength. However, while rigorous quality control may be maintained, using ovens and methods in accordance with the present invention may result in fewer shoes failing quality control checks due to improved processes and process control during adhesive curing.

The present invention may be useful for a variety of processes in the manufacturing of items such as shoes in addition to or instead of curing or otherwise handling adhesives. For example, ovens in accordance with the present invention may be used to dry paints or dyes, to dry shoes or shoe components after washing, to evaporate residual solvents or other substances, etc. While the term "curing" is often used herein to describe processes performed by ovens in accordance with the present invention, ovens in accordance with the present invention may be used for any type of curing, drying, and/or heating of items such as shoes and/or shoe parts.

The present invention permits improved adhesive performance by permitting precise control of cure parameters for a shoe or shoe part. For example, the temperature, rate of temperature change, relative humidity, and/or air flow around a shoe or shoe part may be precisely controlled using ovens and methods in accordance with the present invention. Ovens in accordance with the present invention may utilize different pluralities of infrared sources. Different pluralities of infrared sources and/or different zones of an oven may operate with different heating parameters. Heating parameters may comprise, but are not limited to, a peak spectral wavelength, an output power, a distance between one or more infrared sources and an item to be heated, a density of infrared sources within an area of an oven, a shape of infrared sources, an arrangement of infrared sources relative to an item to be heated, and air flow rate around an item to be heated, a relative humidity of air around an item to be heated, etc. Different zones and/or different pluralities of infrared sources may share all, some or no heating parameters. For example, different pluralities of infrared sources may operate at different peak spectrums, and may have different spectral spreads. By way of further example, different pluralities of infrared sources may be spaced at different distances from an item such as a shoe or shoe part to be cured and at a different density, i.e. with greater numbers of sources per linear distance through the oven. Yet further variation is possible by selecting or controlling the power output of individual infrared sources of a plurality. For example, a first plurality of infrared sources may operate predominately in the mid infrared region, while a second plurality of infrared sources may operate in the near infrared portion of the spectrum. The plurality of mid infrared sources may be operated at a first wattage, while the plurality of near infrared sources may be operated at a second wattage. Similarly, the plurality of mid infrared sources may be positioned at a first distance from an item to be cured with a first linear distance between individual sources of the plurality of infrared sources of the mid infrared plurality, while the plurality of near infrared sources may be positioned at a second distance from an item to be cured with a second linear spacing.

The peak wavelength of one or more infrared source used in an oven in accordance with the present invention may be selected based upon the stage of a curing and/or drying process to be performed using a given source. Different stages of curing and/or drying may involve different components of the item to be cured and/or dried. For example, one or more mid infrared sources may be used at an early stage of an oven in order to quickly dry a part, as water molecules readily absorb mid infrared radiation, thereby evaporating the water molecules. Other types of materials, such as polyethylen and PVC, may preferentially absorb mid infrared radiation, thereby enabling such materials to be rapidly heated using mid infrared sources. Other types of materials may preferentially absorb other wavelengths, and infrared sources strongly emitting at those wavelengths may be selected to heat such materials. Based upon the heating to be performed, energy restrictions, time limitations, materials used, etc., different types of sources in different arrangements and numbers/densities may be used at various stages of an oven in accordance with the present invention.

Sensors within the oven may dynamically measure temperature, humidity, or other properties within the oven or within a particular zone of the oven, thereby permitting an operably connected logical unit to adjust the operation of the oven to attain or maintain desired operating conditions within the oven. For example, the wattage of a plurality of infrared sources or an individual infrared source within a plurality of infrared sources may be adjusted in response to a measured temperature. Based upon sensor reading and target ambient parameters, a logical unit may adjust air flow using fans, activate or deactivates condenser units to impact relative humidity, etc. By way of further example, shoe parts or entire shoes to be cured may be conveyed through the oven on a conveyor belt or other conveyance mechanism, and the rate of travel of the belt may be adjusted in accordance with sensor readings to obtain optimal curing and/or drying conditions for the parts to be cured and/or dried.

While ovens and methods in accordance with the present invention are described herein for examples that cure primers and/or adhesives, ovens and methods in accordance with the present invention may be used to cure paints, dyes, materials, etc.

DRAWINGS

The drawings described herein are referred to using particular numbers in which:

FIG. 1 illustrates a schematic diagram of an example of an energy efficient oven in accordance with the present invention;

FIG. 2 further illustrates an example schematic of an energy efficient oven in accordance with the present invention;

DETAILED DESCRIPTION

Figure 1:
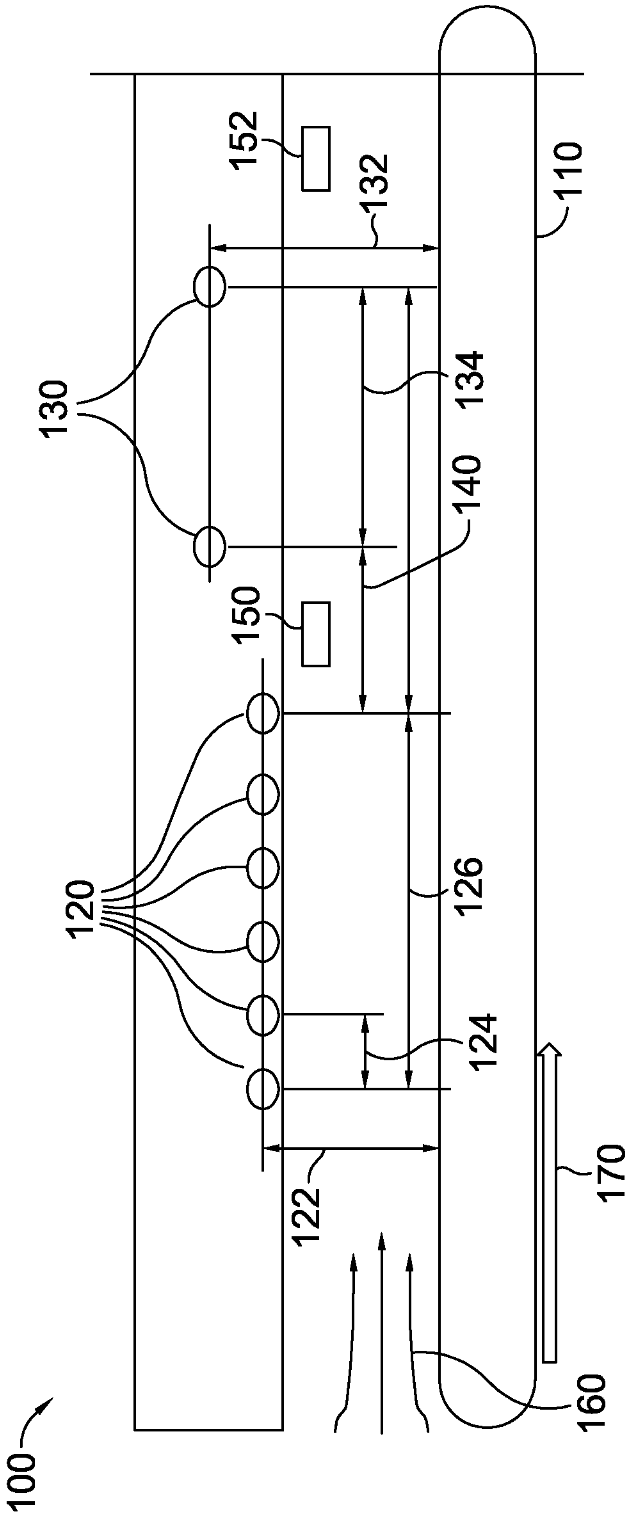

Referring now to FIG. 1, a schematic illustration of an example of an energy efficient oven 100 in accordance with the present invention is shown. In the example illustrated in FIG. 1, a conveyor system 110 may comprise a conveyor belt, chain system, or any other conveyance mechanism to move items to be cured, such as shoes or shoe components, through the oven 100. Oven 100 may use a first plurality of infrared sources 120 to initially heat an item to be cured carried by conveyance mechanism 110. The first plurality of infrared sources 120 may be located at a first distance 122 from the conveyance mechanism 110 and may have a first distance 124 between individual sources of the plurality 120. The first plurality of infrared sources 120 may occupy a first linear distance 126 which, depending upon the distance 124 between individual sources may determine the total number of infrared sources in first plurality 120. First plurality of infrared sources 120 may have a predetermined peak wavelength or spectrum. For example, first plurality of infrared sources 120 may emit primarily in the mid infrared region of the spectrum, although other emission spectra may be used for an oven in accordance with the present invention. A logical unit (not shown) may control the wattage of one or all of the first plurality of infrared sources 120. Alternatively, rather than dynamically controlling the power output of one or more of the first plurality of infrared sources 120, the power output of the first plurality of infrared sources 120 may be predetermined.

A second plurality of infrared sources 130 may be located at a predetermined distance 140 from the first plurality of infrared sources 120. Second plurality of infrared sources 130 may be located at a second distance 132 from conveyance mechanism 110 and an item to be cured conveyed by the conveyance mechanism 110. Second plurality of infrared sources 130 may have a second spacing 134 between individual sources of second plurality 130. In the example schematic illustrated in FIG. 1, second plurality of infrared sources 130 comprises only two infrared sources, but any number of infrared sources may be utilized in second plurality of infrared sources 130. Second plurality of infrared sources 130 may operate at a different peak wavelength and/or different power output than first plurality of infrared sources 120. For example, second plurality of infrared sources 130 may operate primarily in the near infrared range of spectrum, although other spectra may be used for a second plurality of infrared sources in accordance with the present invention. As described with regard to the first plurality of infrared sources 120, second plurality of infrared sources 130 may be operably connected to a logical unit that adjusts the power output of one or more of the individual infrared sources of second plurality 130. Alternatively, the power output of one or more of second plurality of infrared sources 130 may be constant.

The first plurality of infrared sources 120 and second plurality of infrared sources 130 may have various shapes and sizes and may be oriented in different configurations relative to one another and relative to the direction of movement of conveyance mechanism 110. In the example illustrated in FIG. 1, both the first plurality of infrared sources 120 and the second plurality of infrared sources 130 have a shape that provides a longitudinal axis and that longitudinal axis is oriented substantially perpendicular to the direction of movement of conveyance mechanism. However, infrared sources used in accordance with the present invention may be oriented with a longitudinal axis parallel to the direction of movement 170 of a conveyance mechanism 112 or at any other angle relative to the movement 170 of conveyance mechanism 112. Further, individual infrared sources within a first plurality of infrared sources 120 and a second plurality of infrared sources 130 may have other shapes than that depicted in the example of FIG. 1, such as circular, square, triangular, curved, etc. Different infrared sources in a single or different pluralities of infrared sources may have different shapes. While FIG. 1 illustrates an example oven in accordance with the present invention wherein individual infrared sources of a plurality of infrared sources are distributed in a regular pattern in a direction substantially perpendicular to the direction of travel 170 of a conveyance mechanism 110, individual infrared sources within a plurality of infrared sources may also be distributed along a direction parallel (or in any other direction) to the direction of movement 170 of a conveyance mechanism 110, and infrared sources within a plurality of infrared sources need not be distributed in a regular, repeating, or uniform manner as depicted in the example of FIG. 1. Any number of pluralities of infrared sources may be utilized in ovens in accordance with the present invention, such as additional pluralities beyond the first plurality of infrared sources 120 and the second plurality of infrared sources 130 shown in FIG. 1.

In the example illustrated in FIG. 1, first plurality of infrared sources 120 may emit predominately in the mid infrared portion of the spectrum and may be positioned at a first distance 122 from a part to be cured or conveyance mechanism 110, while the second plurality of infrared sources 130 may emit predominately in the near infrared portion of the spectrum and may be positioned at a second distance 132 that is greater than the first distance 122 from the conveyance mechanism 110. In an example such as that illustrated in FIG. 1, the mid infrared radiation from the first plurality of infrared sources 120 may preferentially heat water molecules to remove moisture from a material to be cured, while the near infrared radiation from the second plurality of infrared sources may preferentially heat the air within the oven 100 to establish convection currents and to maintain a steady temperature throughout that portion of the oven 100. In such an example, the first distance 122 may be in a range of 10 to 20 centimeters and the second distance 132 may be in a range of 20 to 30 centimeters. Examples of an appropriate peak wavelengths for emitted spectra of infrared sources in the present example are in the range of 2 to 4 micrometers for the mid infrared and in the range of 0.5 to 1.5 micrometers for the near infrared. Both the first plurality of infrared sources 120 and the second plurality of infrared sources 130 may comprise any number of sources, but may, for example, be between one and four sources. Appropriate spacing longitudinally along an oven 100 in accordance with the present example may be at 10 to 20 centimeter intervals for the first plurality of mid infrared sources 120 and may be at 15 to 20 centimeter intervals for the second plurality of near infrared sources 130. Other peak wavelengths, other source arrangements, different numbers, and other configurations may be suitable for various implementations of the present invention.

The precise type, wattage, and number of infrared sources used for an oven in accordance with the present invention may vary based upon the type of operation to be performed and the materials of the item to be treated using an oven in accordance with the present invention. For example, the example oven 100 of FIG. 1 may use mid infrared sources or, alternatively, a carbon based infrared source, for first plurality of infrared sources 120 in order to facilitate the evaporation of water from a shoe or shoe part. Other types of infrared sources may be selected, however, particularly for performing other operations and/or for treating different types of items.

Still referring to FIG. 1, conditions inside of the oven 100 may be measured or quantified using a first sensor 150 and/or a second sensor 152. While two sensors are illustrated in the example of FIG. 1, any number of sensors, from none to any number exceeding two, may also be used in accordance with the present invention. Sensors such as first sensor 150 and/or second sensor 152 may measure properties such as temperature, humidity, air flow, etc., in any fashion. For example, first sensor 150 may comprise an infrared temperature meter that measures the temperature of a shoe part at a given location within the oven 100, while second sensor 152 may comprise a second infrared temperature meter that measures the temperature of a shoe part at a second location in the oven 100. Measurements obtained by the first sensor 150 and the second sensor 152, both infrared temperature meters in the present example, may be used for monitoring and, if desired, adjusting the temperature in the oven 100 and/or quality control purposes. Further, different sensors may serve different, or even multiple, purposes. As described further herein, other types of sensors, such as humidity sensors, may be useful in determining conditions inside of the oven 100 that may be dynamically adjusted to obtain a beneficial cure quality for shoes or shoe parts moving through the oven 100. Even if an oven such as the example oven 100 illustrated in FIG. 1 are not dynamically controllable based upon the readings of sensors such as first sensor 150 and second sensor 152, the use of sensors may be beneficial for quality control purposes, for data gathering purposes to optimize curing conditions, or for other purposes.

Within oven 100 air flow may facilitate curing of shoes or shoe parts moving along conveyor mechanism 110. As illustrated in the example of FIG. 1, air flow may move generally in the direction indicated by arrows 160 which, in the present example, also corresponds to the direction of part movement indicated by arrow 170. As explained further herein, other air flow directions may be used in addition to or instead of the air flow illustrated in the example schematic of FIG. 1. Air flow may be attained by simply providing openings in the oven, for example doors to receive or expel items before or after the curing process, respectively, through the use of fans, through the use of vents, baffles, or other mechanisms or any other way in which air flow may be managed, manipulated, or controlled to attain desired curing properties and parameters.

Figure 2:
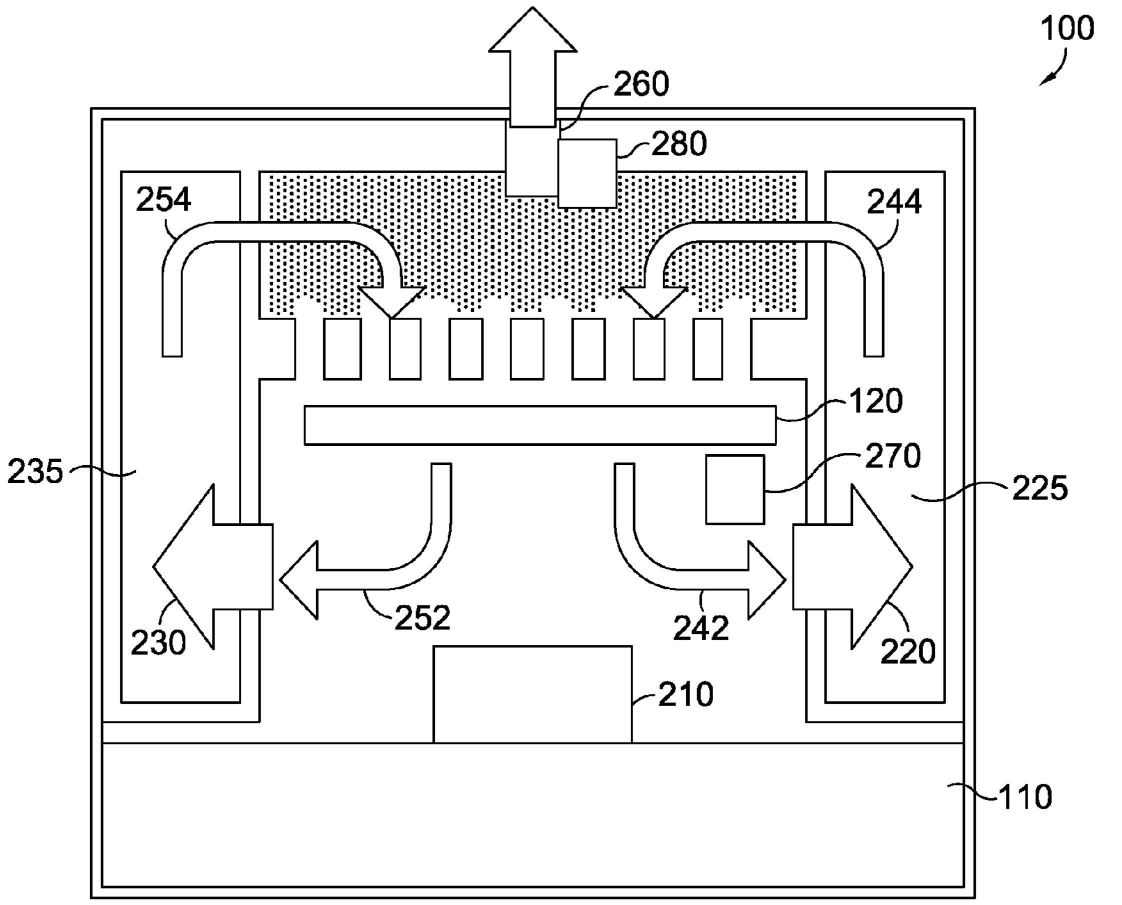

Referring now to FIG. 2, a further schematic illustrating a cross sectional view of oven 100 described with regard to FIG. 1 is illustrated. As shown in FIG. 2, a work piece 210 which may comprise an item such as a shoe, shoe part, or other component to be cured using oven 100 is conveyed on conveyor mechanism 110. In the example illustrated in FIG. 2, one of first plurality of infrared sources 120 is positioned above work piece 210 at the instance illustrated in the example of FIG. 2. A first fan 220 and a second fan 230 are used to establish convention current like air flows around work piece 210. Air flow such as those illustrated in the example of FIG. 2 may be beneficial for a variety of purposes, such as maintaining an even heat distribution within oven 100, moving humidity away from a work piece as it is cured, or for other reasons. In the example illustrated in FIG. 2, first fan 220 draws air out of the oven chamber as indicated by arrow 242 and moves air through a side chamber 225 until the air flow may return at top of the chamber via arrow 244, at which point it may circulate back to be reuptaken by fan 220 as indicated by arrow 242. Similarly, second fan 230 may draw air as indicated by arrow 252 from the oven chamber move that air through side chamber 235 and then return it into the top of the chamber as indicated by arrow 254.

In the example illustrated in FIG. 2, a thermal couple 270 is provided. Thermal couple 270 may comprise one of the sensors illustrated in FIG. 1, or may comprise an additional sensor positioned within the chamber of oven 100 to measure air temperature within oven 100. A humidity sensor 280 is also provided in the example of FIG. 2. Humidity sensor 280 may comprise one of the example sensors illustrated in FIG. 1, or may comprise an additional sensor. One or more logical units may use the measurements by sensors to control the activation and/or wattage of infrared sources, fan activation and/or speed, condenser activation, etc.

FIG. 2 further illustrates that the oven 100 may be vented as indicated by arrow 260 to permit air to exit the oven chamber. Vent 260 may be permanently open or may be adjustable, either manually or automatically under the control of a logical unit, to maintain the oven chamber at a desired temperature, humidity, or other operating condition.

Figure 3:
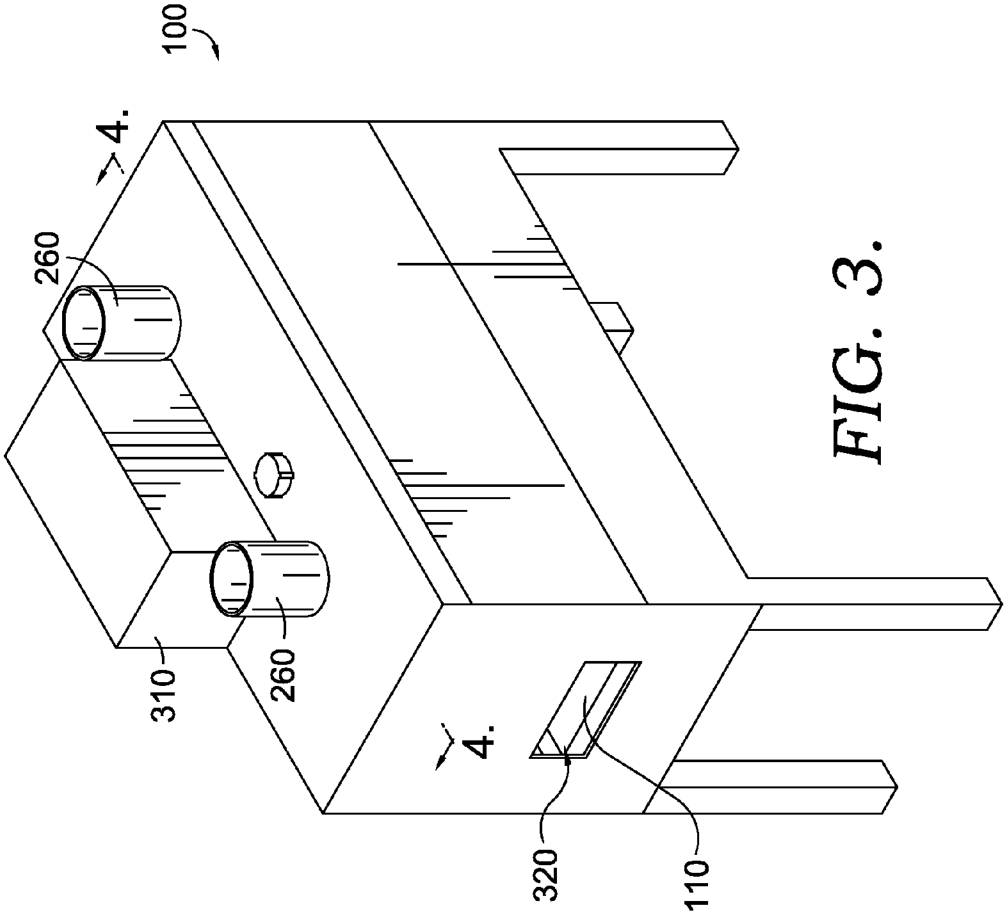
FIG. 3 illustrates a perspective view of an example of an energy efficient oven in accordance with the present invention.

Referring now to FIG. 3, a perspective view of an exemplary oven 100 is illustrated. As can be seen in the example of FIG. 3, an intake door 320 may permit a work piece to be placed upon conveyance mechanism 110. As further illustrated in FIG. 3, a control unit 310 may permit the control of conditions within oven 100. Control unit 310 may be operated by a human operator, may comprise a computing device with appropriate software operating upon it to automatically control the operation of oven 100, or may be some combination of the two. For example, control unit 310 may comprise a logical unit operating software that, in conjunction with the sensors placed within oven 100, adjusts the operational parameters of oven 100 to attain optimal curing of the shoes or shoe parts to be cured within oven 100. Parameters that may be controlled by a logical unit are the power output of infrared sources, the operation of fans, the opening of vents, the speed of operation of a conveyance mechanism, etc. For example, FIG. 3 illustrates a pair of vents 260 that may be opened or closed in varying increments based upon conditions measured within oven 100.

Figure 4:
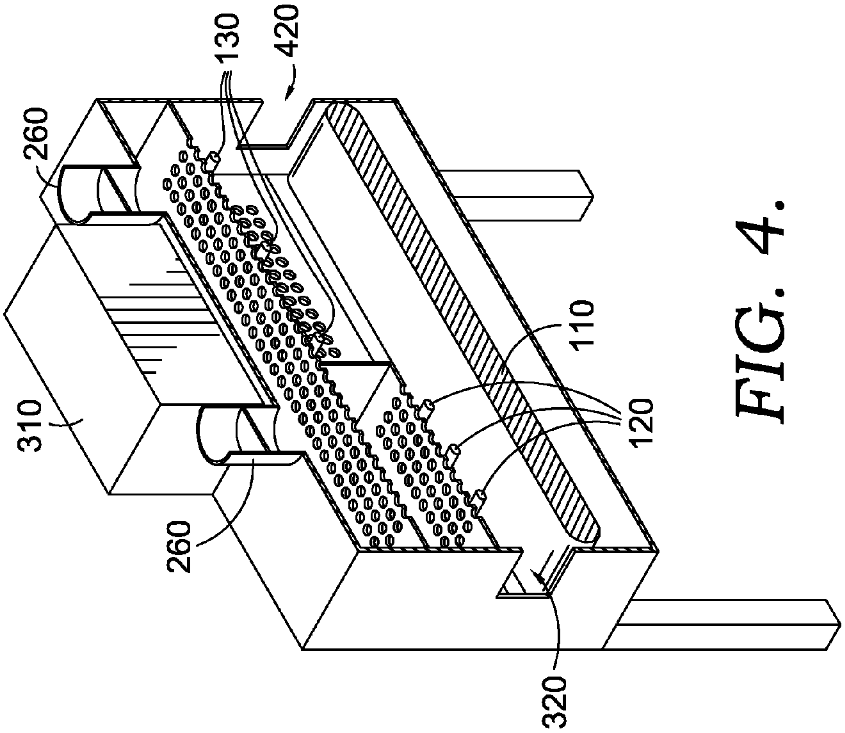
FIG. 4 illustrates a cross sectional view of the example energy efficient oven shown in FIG. 3.

FIG. 3 also illustrates a line 4 along which a cross section is illustrated in FIG. 4. As can be seen in FIG. 4, entrance door 320 may permit a work piece to be placed upon conveyance mechanism 110 while an exit door 420 may permit a cured or partially cured work piece to exit oven 100. As shown in FIG. 4, conveyance mechanism 110 may transport a work piece through oven 100 beneath a first plurality of infrared sources 120 and a second plurality of infrared sources 130.

Operational ranges desired for curing operations inside an oven in accordance with the present invention may vary based upon the type of material being cured, the size, shape, and even color of an item involved in the curing process, the properties desired after curing, such as bond strength, and the like. One example of an possible target temperature for a work piece is 55 degrees Celsius at oven exit and at least 40 degrees Celsius two minutes after exiting the oven. An example target relative humidity may be 62% relative humidity. An example conveyance rate may be 120 mm per second and a total oven time of 180 seconds. More generally, an oven in accordance with the present invention may maintain a piece to be cured at a temperature between about 50 degrees and 80 degrees Celsius.

Figure 5:
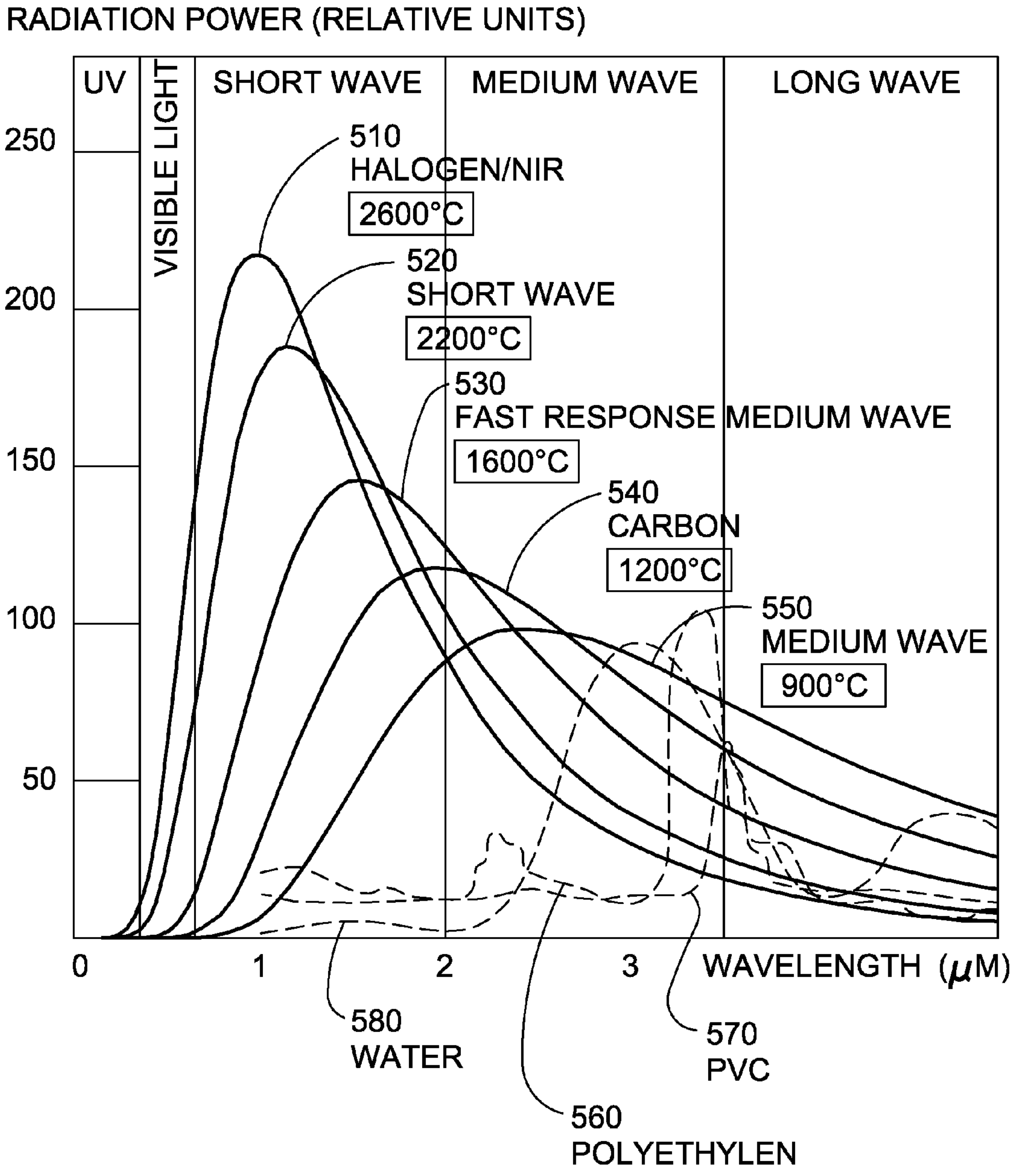
FIG. 5 illustrates examples of emission spectra of some infrared sources that may be used in an oven in accordance with the present invention.

FIG. 5 illustrates a few examples of the emission spectra of infrared sources that may be used in an oven in accordance with the invention. The present invention may utilize various types of sources with similar or different emission spectra than depicted in the example of FIG. 5. For example, an halogen based near infrared source may provide an emission spectrum similar to that depicted as 510. A short wave infrared source may provide an emission spectrum such as that depicted as 520, while a fast response medium wave infrared source may provide a spectrum such as depicted as 530. An exemplary carbon infrared source may provide an emission spectrum such as depicted as 540, while a medium wave source may provide a spectrum such as depicted as 550. As illustrated in FIG. 5, each of these exemplary infrared sources produce an emission spectrum with a range of wavelengths, depicted along the x-axis, and a relative radiation power for a given source depicted along the y-axis. The radiative power depicted on the y-axis relates to the wavelength (or frequency) of the radiation in a known fashion. As can be seen in FIG. 5, each of these example sources has a peak emitted wavelength outside of the visible region of electromagnetic radiation while emitting at a range of other wavelengths. However, infrared sources with narrower or broader emission spectra may be used in accordance with the present invention. Further, the effective relative power of different types of sources used in accordance with the present invention may varied by using different wattages, different numbers of sources of a given type, different densities of sources, and different distances of sources from an item to be cured.

Referring still to FIG. 5, absorption patterns of various materials that may be exposed to radiation from infrared sources within an oven in accordance with the present invention are also illustrated. These materials, as well as others, may comprise components of an item to be cured and/or dried. For example, an absorption spectrum for polyethylen 560 is illustrated, showing the wavelengths at which polyethylen preferentially absorbs infrared radiation. As polyethylen is a material that may frequently be encountered in the shoe fabrication process, infrared sources may be selected to preferentially interact with polyethylen (if the intention is to heat the polyethylen) or to avoid absorption by polyethylen (if the intention is to avoid heating the polyethylen). Also illustrated in FIG. 5 is the absorption spectrum of PVC 570, another material often encountered in shoe fabrication. Infrared sources may be selected for use in an oven in accordance with the present invention based upon the rate at which radiation from those sources will, or will not, interact with PVC. Still referring to FIG. 5, an absorption spectrum for water 580 is also illustrated. As briefly described above, ovens in accordance with the present invention may frequently be employed to evaporate water from a shoe or shoe part for curing and/or drying purposes. Accordingly, infrared sources used in an oven in accordance with the present invention may be preferentially selected from sources having a relatively high amount of emissions within the mid infrared range of the spectra highly absorbed by water molecules. Conversely, if the evaporation of water is not desired, sources that emit lesser amounts of radiation in a range of the spectrum preferentially absorbed by water molecules may be selected.

While infrared sources may be selected based upon the emission spectra provided by those sources, whatever the emission spectra preferred for an infrared source may be, the arrangement of the infrared sources within an oven may be varied based upon the desired operations of a given stage of an oven. A first plurality of infrared sources may emit infrared radiation with a first peak wavelength that selectively interacts with a first particular component of an item to be heated/cured/dried, while a second plurality of infrared sources may emit infrared radiation with a peak wavelength that selectively interacts with a second particular component of an item to be heated/cured/dried. While one particular configuration of a first plurality of infrared sources 120 and a second plurality of infrared sources 130 within an example oven 100 were illustrated and described above with regard to FIG. 1, a wide variety of other arrangements and/or configurations of infrared sources are within the scope of the present invention. A few examples of alternative configurations of infrared sources are illustrated in FIGS. 6-10, but the present invention is not limited to these examples or the examples illustrated in FIG. 1.

Figure 6:
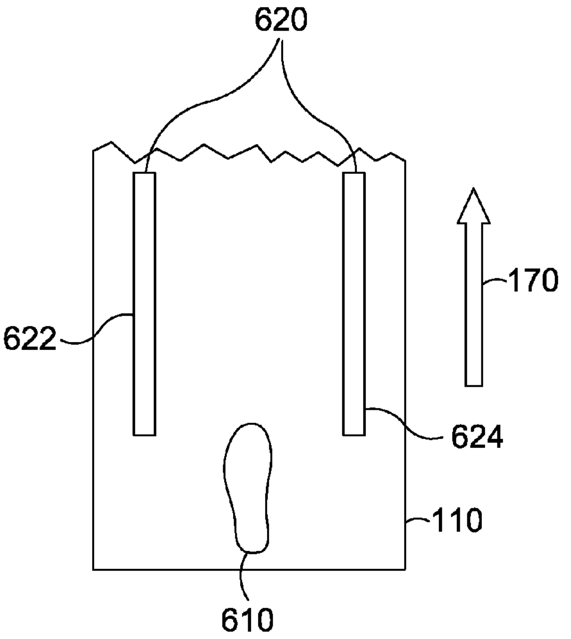
FIGS. 6-10 illustrate various examples of some configurations of infrared sources that may be used in an oven in accordance with the present invention.

FIG. 6 illustrates a conveyance system 110 transporting a shoe part 610 in the direction indicated by arrow 170. In the example illustrated in FIG. 6, a first plurality of infrared sources 620 comprises a left source 622 and a right infrared source 624. The terms "left" and "right" are used in the example of FIG. 6 because shoe part 610 is represented as a sole having a left and right side as shoe part 610 is conveyed by conveyance system 118. However, the terms "left" and "right" need not relate to any configuration of a shoe or shoe part or other item treated using an oven in accordance with the present invention when worn or used. In the example illustrated in FIG. 6, left infrared source 622 may be particularly useful for exposing the corresponding side of shoe part 610, while right infrared source 624 may be particularly useful for exposing the corresponding side of shoe part 610 to infrared radiation.

Figure 7:
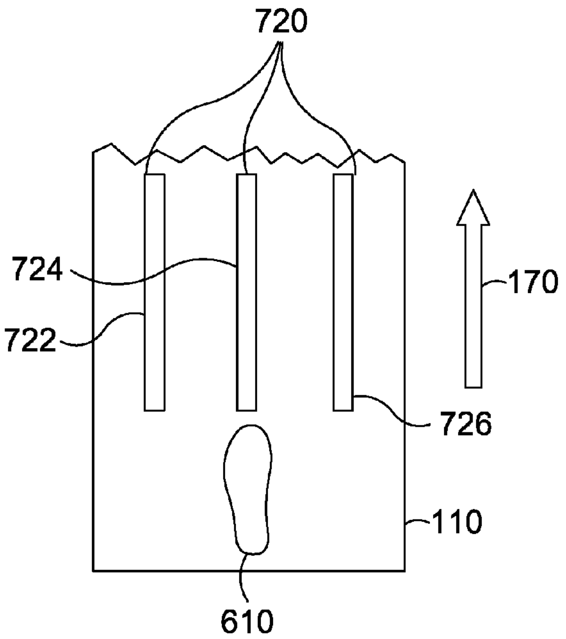

Yet a further example of a possible configuration of infrared sources is illustrated in FIG. 7. In FIG. 7, a shoe part 610 is moved by conveyance mechanism 110 in the direction indicated by arrow 170. A first plurality of infrared sources 720 may comprise a left infrared source 722, a middle infrared source 724, and a right infrared source 726. While FIG. 6 illustrates two infrared sources in a plurality of infrared sources 620, and while FIG. 7 illustrated three infrared sources in a plurality of infrared sources 720, any number of infrared sources may be used in a plurality of infrared sources for an oven in accordance with the present invention.

Figure 8:
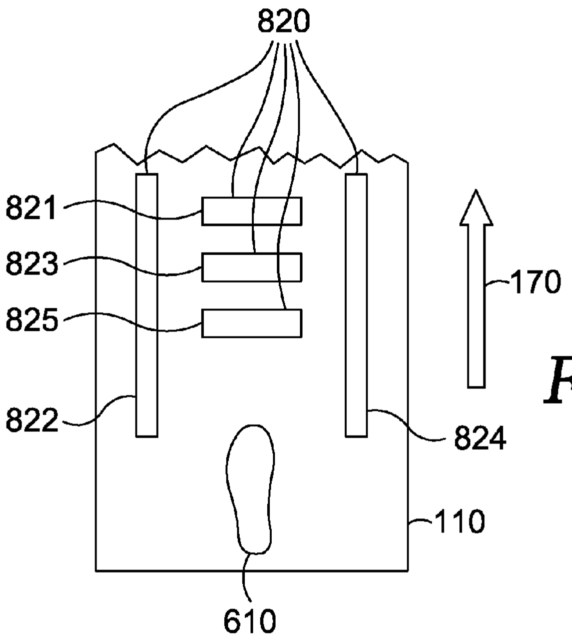

Referring now to FIG. 8, another example of a possible arrangement of infrared sources for an oven in accordance with the present invention is illustrated. In the example of FIG. 8, a shoe part 610 is moved by a conveyance mechanism 110 in a direction indicated by arrow 170. A first plurality of infrared sources 820 may comprise a first longitudinal infrared source 822 and a second longitudinal infrared source 824 oriented along the direction of travel 170 of a shoe part 610 through the oven. In the example of FIG. 8, a further first perpendicular infrared source 821, a second perpendicular infrared source 823, and a third perpendicular infrared source 825 may be situated between the first longitudinal infrared source 822 and the second longitudinal infrared source 824 and oriented perpendicular to the direction of travel 170 of a shoe part 610 through the oven.

Figure 9:
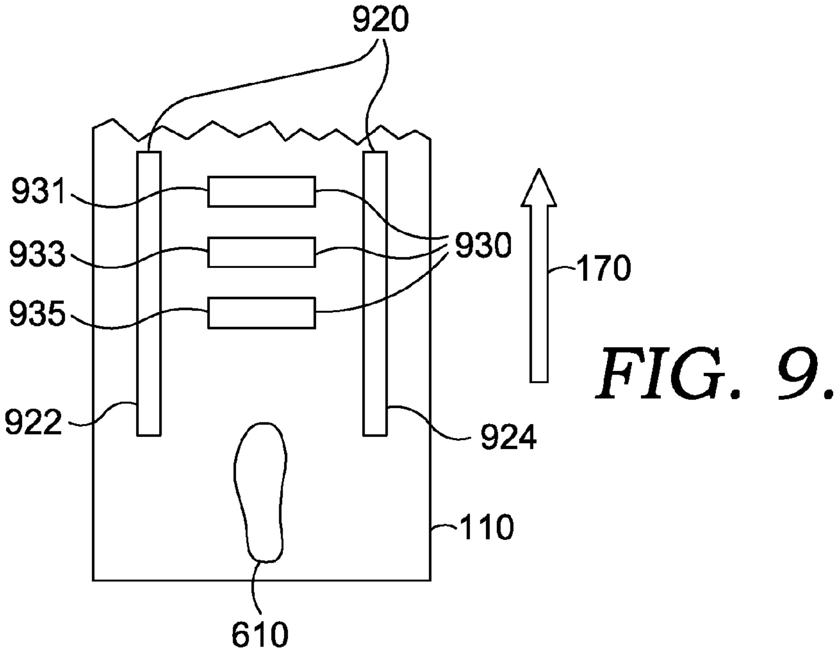

Referring now to FIG. 9, yet a further example of a possible arrangement of infrared sources for an oven in accordance with the present invention is illustrated. The arrangement of infrared sources shown in the example of FIG. 9 resembles the arrangement of infrared sources shown in the example of FIG. 8, but the infrared sources of the example of FIG. 9 are configured into different groups to illustrate one example of a non-linear arrangement of different groups of infrared sources for an oven in accordance with the present invention. A shoe part 610 may be transported by a conveyance mechanism 110 in a direction indicated by arrow 170. A first plurality of infrared sources 920 may comprise a first longitudinal infrared source 922 and a second longitudinal infrared source 924 oriented along the direction of travel 170 of a shoe part 610 through the oven. As illustrated in the example of FIG. 9, the first longitudinal infrared source 922 may be located at a lateral side of shoe part 610 when shoe part 610 is moved by conveyance mechanism 110 through an oven, while second longitudinal infrared source 924 may be located at the medial side of shoe part 610 while shoe part 610 is moved by conveyance mechanism 110 through oven. The second plurality of infrared sources 930 may comprise a first perpendicular infrared source 931, a second perpendicular infrared source 933, and a third perpendicular infrared source 935. In the example illustrated in FIG. 9, the second plurality of infrared sources 930 are positioned between the first longitudinal infrared source 922 and the second longitudinal infrared source 924 and are oriented perpendicular to the direction of travel 170 of shoe part 610 through the oven. The first plurality of infrared sources 920 may possess a first set of heating characteristics, such as a peak wavelength, a distance from shoe part 610, a wattage, etc., and second plurality of infrared sources 930 may possess a second set of heating parameters. Accordingly, different parts of shoe part 610 may be exposed to different heating conditions from the first plurality of infrared sources 920 and the second plurality of infrared sources 930. Further, a logical unit, such as described above, may independently control the first plurality of infrared sources 920 and the second plurality of infrared sources 930.

Figure 10:
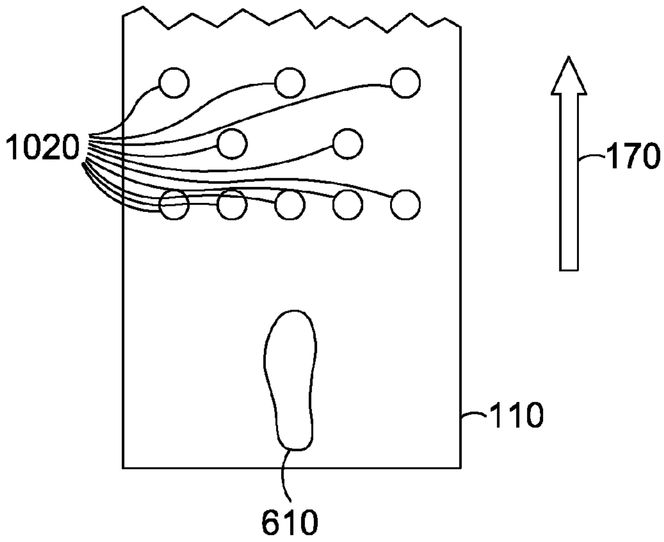

Referring now to FIG. 10, yet a further example of an arrangement of infrared sources for an oven in accordance with the present invention is illustrated. In the example of FIG. 10, a shoe part 610 may be moved by conveyor mechanism 110 in the direction indicated by arrow 170. As shown in the example of FIG. 10, a first plurality of infrared sources 1020 may comprise infrared sources having a circular shape and with an irregular spacing and arrangement.

Broadly speaking, an oven in accordance with the present invention may provide at least a first plurality of infrared sources having a first set of heating parameters associated with that plurality of infrared sources and a second plurality of infrared sources having a second set of heating parameters associated with the second plurality of infrared sources. Heating parameters may comprise a peak wavelength of an emission spectrum, a wattage, a density, a number, a distance from a shoe or shoe part, an exposure duration, and the like. Different pluralities of infrared sources, such as a first plurality of infrared sources and a second plurality of infrared sources, may be selected and/or configured to perform different operations desired in the curing, drying, heating, and/or other processing of a shoe or shoe part. Different heating properties may be desired for different pluralities of infrared sources used in an oven in accordance with the present invention based upon factors such as the materials used in shoe construction, energy constraints, time constraints, and the like.

By sequentially exposing a piece to be cured to different types of infrared radiation, different components in a material to be cured may respond differently. For example, water based materials may respond quickly to mid-infrared wavelengths, while near infrared wavelengths may permit quick temperature adjustments and precise temperature control.

While the invention is illustrated herein with specific examples, variations may be made within the scope of the present invention. For example, more than two pluralities of infrared sources may be used without departing from the scope of the present invention, while fewer than two pluralities may be used without departing from the scope of the present invention. The number of infrared sources of any given plurality and their relative spacing may be varied. Further, the positioning of any one infrared source or any plurality of infrared sources may be adjustable, either dynamically or in between oven operation cycles to permit a finer adjustment of the infrared radiation delivered to work pieces. For example, infrared sources may be moved closer or further from a conveyance mechanism and may be spaced more or less densely along a linear distance within an oven.

What is claimed is:

1. An energy efficient infrared oven comprising:

a conveyor system that moves items through the oven at a predetermined rate of speed in a first direction, such that the items sequentially pass through zones of the oven from an entrance to the oven to an exit from the oven;

a first heating zone within the oven comprising a first plurality of infrared sources configured to emit mid-infrared radiation ("MIR") within a range of 2 to 4 micrometers;

a second heating zone within the oven comprising a second plurality of infrared sources configured to emit near-infrared radiation ("NIR") within a range of 0.5 to 1.5 micrometers, the second heating zone contained within the oven such that an item transported by the conveyance mechanism encounters NIR only after the item encounters MIR; and an air circulation system comprising a side channel along a side of the oven between the entrance and the exit that moves air inside the oven from the first plurality of infrared sources toward the conveyor system.

2. The oven of claim 1, wherein the first plurality of infrared sources are spaced a first distance from the conveyor system and the second plurality of infrared sources are spaced a second distance from the conveyor system, wherein the first distance is less than the second distance.

3. The oven of claim 1, wherein the air circulation system moves air inside the oven from the first and the second pluralities of infrared sources toward the items moved by the conveyor system.

4. The oven of claim 1, further comprising:

a humidity detection system that measures the humidity of air moved by the air circulation system; and an adaptive air flow control system that adjusts the operation of the air circulation system based upon the humidity measured by the humidity detection system.

5. The oven of claim 1, further comprising a temperature measurement system that measures the temperature inside of the oven at least one location.

6. The oven of claim 5, further comprising an adaptive temperature control system adjusts an output power associated with at least one of the first plurality of infrared sources and the second plurality of infrared sources based upon temperatures measured by the temperature measurement system.

7. The oven of claim 1, wherein the first plurality of infrared sources includes a total number of infrared sources of between 2 and 4.

8. The oven of claim 1, wherein the second plurality of infrared sources includes a total number of infrared sources of between 2 and 4.

9. An energy efficient oven comprising:

a conveyance mechanism that transports items to be heated from an entrance to the oven to an exit from the oven, the conveyance mechanism transporting items in a linear fashion at a predetermined rate;

a first plurality of infrared sources that emit infrared radiation with a peak wavelength within the range of 2 to 4 micrometers ("MIR"), the first plurality of infrared sources contained within the oven such that an item transported by the conveyance mechanism encounters radiation emitted by the first plurality of infrared sources, the first peak wavelength selectively interacting with a first particular component of the item to be heated;

a second plurality of infrared sources that emit infrared radiation at a peak wavelength within the range of 0.5 to 1.5 micrometers ("NIR"), the second plurality of infrared sources contained within the oven such that an item transported by the conveyance mechanism encounters NIR only after the item encounters MIR, the second peak wavelength selectively interacting with a second particular component of the item to be heated; and an air circulation system comprising a side channel along a side of the oven between the entrance and the exit that moves air inside the oven from the first plurality of infrared sources toward the conveyor system.

10. The energy efficient oven of claim 9, wherein the air circulation system that moves air within the oven around an item to be heated circulates air past the first plurality of infrared sources.

11. The energy efficient oven of claim 10, further comprising:

a sensor that measures at least a first parameter within the oven; and a logical unit operably connected to the sensor that receives at least a measured first parameter and adjusts the operation of the oven based upon a comparison of the measured first parameter and a target parameter.

12. The energy efficient oven of claim 9 wherein the first component of the item to be heated is water.

13. The energy efficient oven of claim 9, wherein the first plurality of infrared sources are located at a first distance from an item transported by the conveyance mechanism and wherein the second plurality of infrared sources are located at a second distance from an item transported by the conveyance mechanism, the first distance being shorter than the second distance.

14. The energy efficient oven of claim 13, wherein the first peak wavelength and the second peak wavelength are not the same.

15. An energy efficient infrared oven comprising:

a conveyor system that moves items through the oven at a predetermined rate of speed in a first direction, such that the items sequentially pass through zones of the oven from an entrance to the oven to an exit from the oven;

a first heating zone within the oven comprising a first plurality of infrared sources spaced a first distance from a surface of the items moved by the conveyor system, the first plurality of infrared sources emitting MIR; and a second heating zone within the oven comprising a second plurality of infrared sources spaced a second distance from a surface of the items moved by the conveyor system, the second plurality of infrared sources emitting NIR, wherein the first distance is less than the second distance.

* * * * *